Sept. 18, 1956 C. T. DENKER ET AL 2,763,506
SHOVEL HANDLE
Filed July 2, 1951

INVENTORS.
CHARLES T. DENKER
JOHN KMIT

BY *Wallace and Cannon*

ATTORNEYS

United States Patent Office 2,763,506
Patented Sept. 18, 1956

2,763,506

SHOVEL HANDLE

Charles T. Denker and John Kmit, Chicago, Ill., assignors to The Denit Corporation, Chicago, Ill., a corporation of Delaware Application July 2, 1951, Serial No. 234,828

2 Claims. (Cl. 294—57)

This invention relates to shovels and similar tools, and especially to equipment enabling the same to be compactly stored.

In many sections of the country it is customary for the operators of automotive vehicles to carry with them a shovel, scraper or similar instrument for the removal of snow or the like to free the vehicle from the snow or the like. In such circumstances it is advantageous to resort to a shovel or like arrangement which may be stored in a relatively small space, especially insofar as the handle of the tool may be concerned. There are, of course, many other instances where it is advantageous to enable a shovel or similar tool to be compactly stored and the foregoing instance where this is desirable is merely exemplary.

In view of the foregoing it is a primary object of our invention to afford a novel arrangement in a shovel or similar tool that will enable compact storing thereof.

Other objects of the invention are to provide a shovel or the like including a handle which may be folded upon itself so as to thereby reduce the over-all length thereof to facilitate storage of the tool; to insure against unwanted collapsing of the handle of the tool of the aforesaid nature, especially when the same is in use; to so arrange a handle of the aforesaid character that adjoining sections thereof may be moved into substantially parallel relation and to so arrange such a portion of sections that a sleeve or like arrangement may be disposed over the adjoining portions thereof to prevent undesired relative movement between these sections; to retain a sleeve or like member in retaining position in such a way that it may be quickly released from such a position so as to enable the handle sections to be moved relatively to each other; and to provide a novel arrangement of the aforesaid character that will be of simple and economical construction and efficacious and positive in use.

Other and further objects of the present invention will be apparent from the following description and claims and are illustrated in the accompanying drawing which, by way of illustration, shows a preferred embodiment of the present invention and the principle thereof and what we now considered to be the best mode in which we have contemplated applying that principle. Other embodiments of the invention embodying the same or equivalent principle may be used and structural changes may be made as desired by those skilled in the art without departing from the present invention and the purview of the appended claims.

Figure 1:
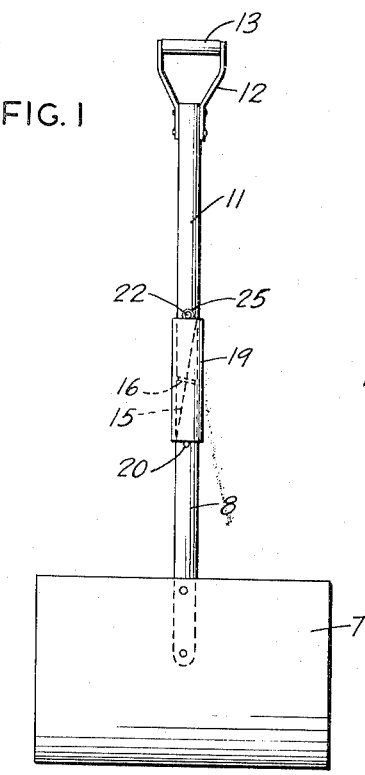
Fig. 1 is a front elevational view of the shovel embodying our invention.
Figure 2:
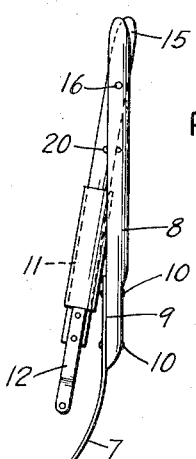
Fig. 2 is a side elevational view showing the handle of the shovel illustrated in Fig. 1 in collapsed position.
Figure 3:
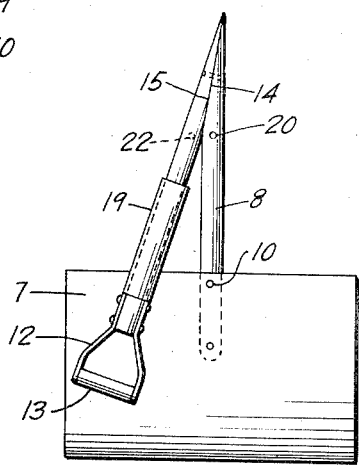
Fig. 3 is a rear elevational view showing the handle in collapsed position.
Figures 4, 6:
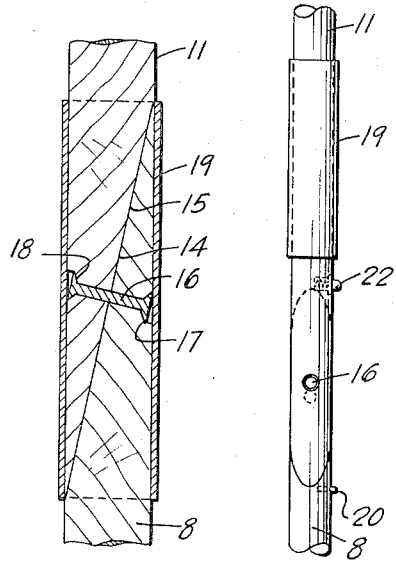
Fig. 4 is a vertical sectional view illustrating adjoining sections of the handle.
Figure 5:
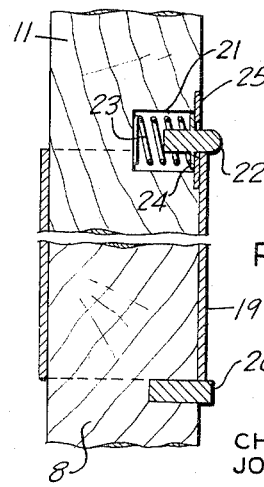

Fig. 5 is a fragmentary vertical sectional view drawn to an enlarged scale, taken substantially in 90° relation with the plane in which Fig. 4 is taken, and showing adjoining sections of our arrangement and the means for retaining the same in operative position; and Fig. 6 is a view showing the retaining portion of our arrangement moved out of retaining position to enable the handle to be arranged in the manner shown, for example, in Figs. 2 and 3.

While our invention may be incorporated in shovels or similar tools of various designs, in the present instance we have shown a shovel or scraper embodying a body portion or blade 7 formed from sheet material and which desirably has a somewhat arcuate configuration imparted to the lower portion thereof, as indicated in Fig. 2, to thereby dispose the free edge of the body forwardly of the handle that is attached to the body medially in the transverse extent thereof and near the upper edge of said body. Thus, in the present instance a handle member 8 is provided which, as best shown in Fig. 2, includes a surface 9 against which the upper flat marginal portion of the body 7 may be rested and desirably handle portion 8 is connected to body 7 by rivets 10 or the like.

Our arrangement also embodies an upper handle section 11 which, as illustrated, may have brackets as 12 secured to the free end thereof to afford a support for a grip 13.

As best shown in Fig. 4, the upper end of the handle section 8 embodies a flat angular disposed face 14 and the lower portion of the handle section 15 has a complementary angular disposed flat face thereon. Preferably when the faces 14 and 15 are abutted, then the handle sections 8 and 11 are arranged in alignment one with the other. In order to permit relative movement between the handle sections 8 and 11 a rivet 16 or the like is passed through the faces 14 and 15 and into the adjoining portions of the respective body sections 8 and 11, said rivet being extended in normal relation to the complementary faces 14 and 15. A recess 17 is provided in the handle section 8, and a corresponding recess 18 is provided in the handle section 11, and the head portions of the rivet or other connecting member such as a bolt are respectively disposed in these recesses, the arrangement being such that the end portions of the connecting member 16 are located within the confines of the outline of the handle sections 8 and 11.

In order to prevent the handle sections 8 and 11 moving relative to each other about the rivet 16, a sleeve 19 is provided which, as best shown in Fig. 4, is of a length substantially equal to the vertical length of faces 14 and 15 and when this sleeve is aligned with the faces 14 and 15, it prevents relative movement between the handle sections 8 and 11 and thus is effective to lock the handle sections 8 and 11 against collapsing movement. Desirably the configuration of the sleeve 19 is complementary to the outline of the handle sections 8 and 11.

A pin 20 is mounted in the handle section 8 in a position to engage the lower end of the sleeve 19 and thereby retain the same in alignment with the faces 14 and 15. A recess 21 is formed in the handle section 11 in position to receive a pin 22 and a spring 23 which is effective on a collar 24 mounted on the pin 22. A plate 25 is provided to limit outward movement of the pin 22 under influence of the spring 23, this plate being mounted to cover the open end of the recess 21 and having the marginal portions thereof disposed in a rabbeted groove about the open end of the recess 21. The recess 21 and the parts disposed therein are so located that when the lower end of the sleeve 19 is engaged with the pin 20, then the pin 22 will be engaged with the upper end of the sleeve 19. This arrangement prevents the sleeve 19 from moving from alignment with the faces 14 and 15 and thereby relative movement between the handle sections 8 and 11 is prevented. When it is desired to move the handle sections 8 and 11 relative to each other and in the positions like that shown in Figs. 2 and 3, the pin 22 is depressed against the effect of the spring 23 to be cleared from the adjacent end of the sleeve 19. Thereupon the sleeve 19 may be slid upwardly on the handle section 11 from a locking relation into a releasing relation with respect to the handle sections, as for example, into the position shown in Fig. 6 or Fig. 3. When the sleeve 19 is disposed in such a releasing position then the handle sections 8 and 11 may be pivoted about the rivet 16 in a collapsing direction and thereupon these handle sections can be disposed in the positions shown in Figs. 2 and 3.

It will be manifest from the foregoing description that we have provided an arrangement which enable the hereinabove set forth and kindred objects of this invention to be realized, but it will be understood that this arrangement is capable of variation and modification, and I therefore do not wish to be limited to the precise details set forth, but desire to avail myself of such changes and alterations as fall within the purview of the following claims.

We claim:

1. In a shovel having a collapsible handle member including aligned upper and lower sections each having inner ends respectively embodying complementary beveled face portions, a shovel blade attached to the lower one of said handle sections, a pivot pin passed through said face portions at right angles thereto and connecting said handle sections for relative turning movement about said face portions from an extended to a collapsed relation, said beveled face portions lying in a plane which passes upright through the plane bounded by the four sides of said blade, and said beveled face portions lying in a corresponding inclined plane that extends directionally from one side of the handle member to the opposed other side, a sleeve slidably disposed about the inner end portions of said handle sections when the shovel is uncollapsed to prevent relative turning movement between said sections, a depressible spring stop mounted in said inner end portion of the upper handle section for engaging the corresponding upper end of the sleeve to hold the sleeve against movement along the upper handle section when the shovel is uncollapsed, and a fixed stop mounted in the said inner end portion of the lower handle section for engaging the corresponding lower end of the sleeve to hold the sleeve against movement along the lower handle section when the shovel is uncollapsed, said face portions being beveled sufficiently to permit the upper end of the upper handle section to be turned about the beveled face of the lower handle section to dispose the upper handle section over the blade in a collapsed relation after depressing the spring stop and moving said sleeve along the upper handle section.

2. In a shovel having a collapsible handle member including aligned upper and lower sections respectively embodying complementary beveled face portions at the ends thereof disposed opposite one another, a shovel blade attached to the other end of the lower handle section with the plane of said beveled face portions passing upright through the plane bounded by the sides of the blade so that the upper handle section may be turned on the lower handle section to be disposed in a collapsed relation over the shovel blade and said beveled face portions lying in a corresponding inclined plane that extends directionally from one side of the handle member to the opposed other side, a pivot pin interconnecting said sections with the face portions engaged one with the other and so as to permit relative turning movement of said sections about the beveled faces thereof between collapsed and uncollapsed relations, a sleeve slidably disposed in a locking relation about the portions of said handle sections having the beveled face portions to prevent relative turning movement between said sections when arranged in an uncollapsed relation, and means for releasably retaining said sleeve in said locking relation, said means including a depressible spring stop in the upper handle section in position to engage the upper end of the sleeve and a fixed stop in the lower handle section to engage the lower end of the sleeve, whereby the sleeve may be slidably moved along the upper handle section between locking and releasing positions relative to the handle section.

References Cited in the file of this patent

UNITED STATES PATENTS

| | | |
|---|---|---|
| 1,654,958 | Breton | Jan. 3, 1928 |
| 1,906,218 | Patchell | Apr. 25, 1933 |
| 2,013,192 | Smith | Sept. 3, 1935 |

FOREIGN PATENTS

| | | |
|---|---|---|
| 60,026 | Germany | Nov. 28, 1891 |